United States Patent
Kawakami et al.

[11] Patent Number: 6,098,988
[45] Date of Patent: Aug. 8, 2000

[54] MECHANISM FOR FORMING A SEAL AROUND THE SHAFT OF A LIQUID PUMP

[75] Inventors: Yasunobu Kawakami; Naoki Ohta; Hiroshi Ichikawa; Masaru Kanno; Katsuharu Kinoshita; Masayasu Sakata, all of Wako, Japan

[73] Assignee: Honda Giken Kogyo Kabushiki Kaisha, Tokyo, Japan

[21] Appl. No.: 09/057,521

[22] Filed: Apr. 9, 1998

[30] Foreign Application Priority Data

Apr. 18, 1997 [JP] Japan ..................... 9-101348

[51] Int. Cl.$^7$ ....................................... F16J 9/26
[52] U.S. Cl. ..................... 277/440; 277/443; 277/938
[58] Field of Search ..................... 277/440, 442, 277/443, 448, 534, 539, 627, 935, 938, 939

[56] References Cited

U.S. PATENT DOCUMENTS

| | | |
|---|---|---|
| 4,632,150 | 12/1986 | Gagas . |
| 4,681,817 | 7/1987 | Shinada . |
| 4,693,481 | 9/1987 | Quinn . |
| 4,751,871 | 6/1988 | Burghardt et al. . |
| 5,037,276 | 8/1991 | Tremoulet, Jr. . |
| 5,549,462 | 8/1996 | Mischler et al. . |

FOREIGN PATENT DOCUMENTS

| | | |
|---|---|---|
| 53-148657 | 12/1978 | Japan . |
| 55-100421 | 7/1980 | Japan . |
| 60-136667 | 7/1985 | Japan . |
| 62-176970 | 8/1987 | Japan . |
| 1-120486 | 5/1989 | Japan . |
| 6-32646 | 2/1994 | Japan . |
| 7-19349 | 1/1995 | Japan . |
| 8-296746 | 11/1996 | Japan . |

Primary Examiner—Anthony Knight
Assistant Examiner—Karlena D. Schwing
Attorney, Agent, or Firm—Birch, Stewart, Kolasch & Birch, LLP

[57] ABSTRACT

A mechanism for forming a liquid-tight seal around the rotary shaft of a liquid pump having a stationary ring attached to the casing of the pump and a rotating ring attached to the rotary shaft and contacting the stationary ring. The stationary ring is formed from baked carbon, while the rotating ring is a sintered product of silicon nitride. The stationary ring has an effective seal width ratio, rp/Di, of 0.07/1 to 0.22/1, where rp is the width of the effective seal surface of the stationary ring and Di is its inside diameter.

5 Claims, 6 Drawing Sheets

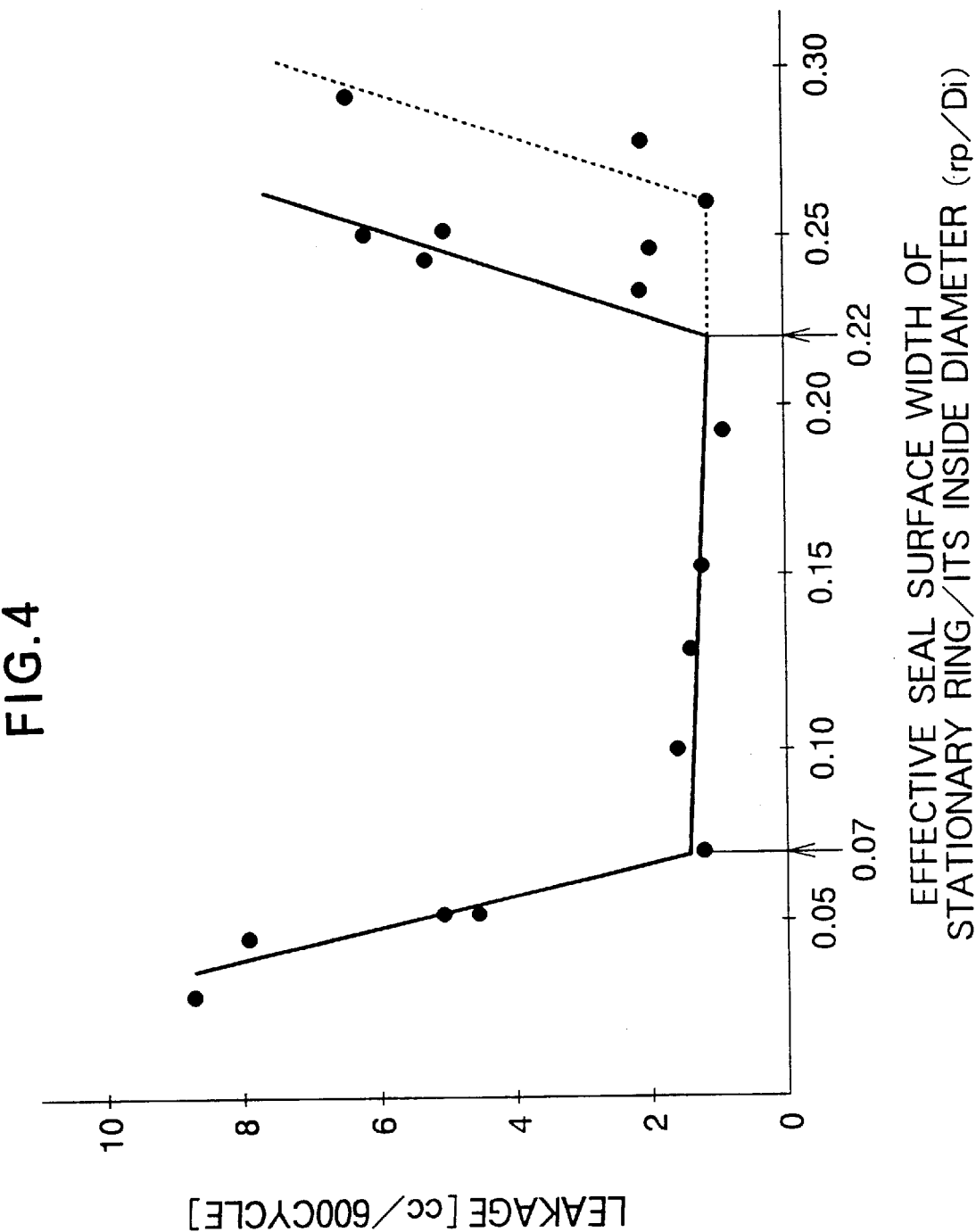

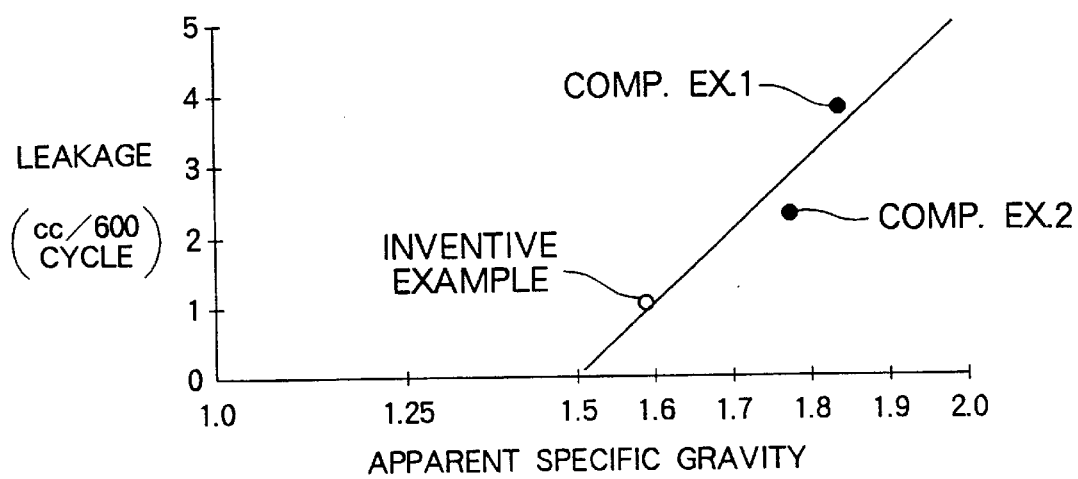
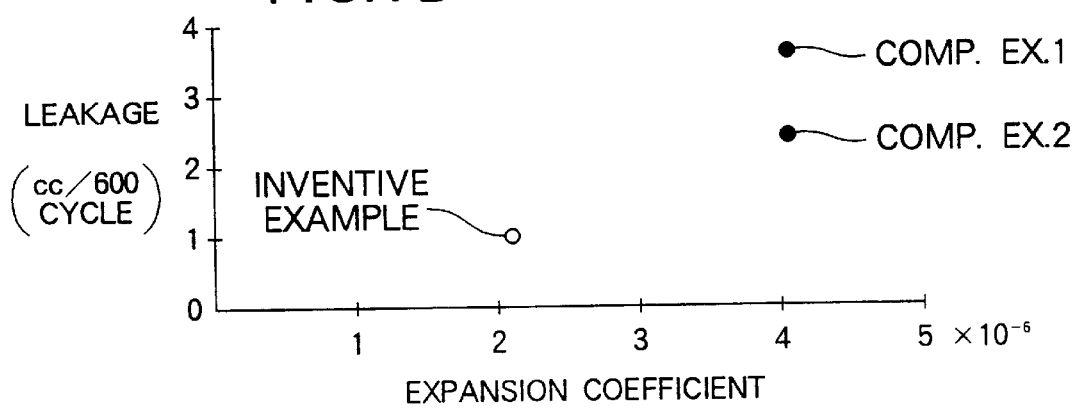
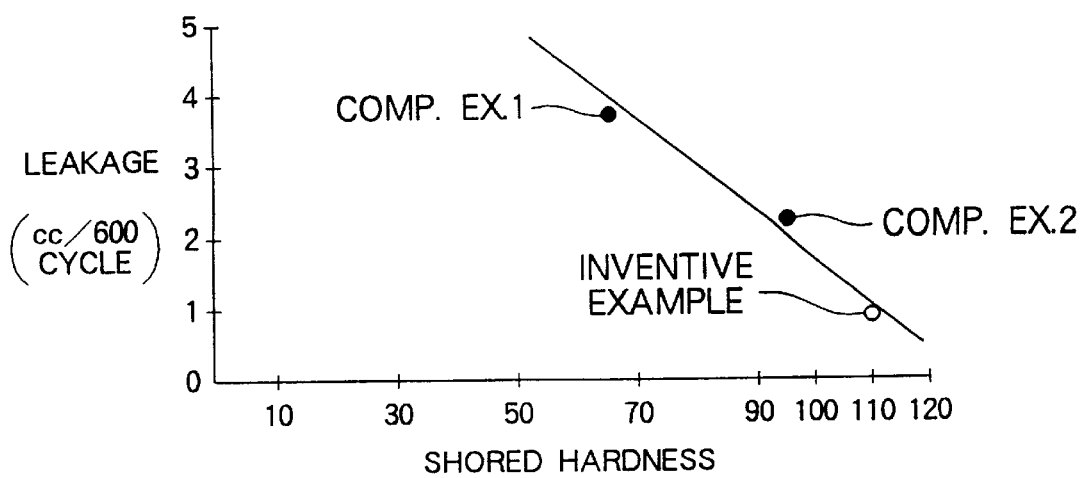

MECHANISM FOR FORMING A SEAL AROUND THE SHAFT OF A LIQUID PUMP

BACKGROUND OF THE INVENTION

1. Field of the Invention

This invention relates to an improved mechanism for forming a liquid-tight seal around the rotary shaft of a liquid pump.

2. Description of the Related Art

A liquid pump has a sealing mechanism for preventing any liquid from leaking out of its casing along its rotary shaft extending through the casing. A known sealing mechanism is disclosed in, for example, Japanese Patent Application Laid-Open No. SHO 55-100421 entitled "Ceramic Sliding Device", or No. HEI 7-19349 entitled "Sliding Device".

The mechanism as disclosed in the former application has one of its rotary and stationary members formed from a sintered product of silicon nitride, while the other is a sintered product of silicon carbide. This mechanism has, however, a drawback which is due to the hardness of the two materials. The two members abrade each other, and the dust produced by their abrasion is caught between the sliding surfaces and accelerates their wear and shortens their life.

The mechanism as disclosed in the latter has a sliding member of carbon and a sliding member of alumina ceramics which has a sliding surface having a roughness Ra of 0.1 to 0.3 micron. It has, however, been found that its sliding member of alumina ceramics fails to provide a good seal.

SUMMARY OF THE INVENTION

According to a first aspect of this invention, there is provided a mechanism comprising a stationary ring attached to a casing of a liquid pump and a rotating ring attached to a rotary shaft and contacting the stationary ring to form a liquid-tight seal around the rotary shaft or the liquid pumps extending through the casing, wherein the stationary ring is formed from baked carbon, while the rotating ring is formed from a sintered product of silicon nitride, and the stationary ring has an effective seal width ratio, rp/Di, of 0.07/1 to 0.22/1, where rp is the width of the effective seal surface of the stationary ring and Di is its inside diameter.

If the seal surface width, rp, is too small, the mechanism may easily fail to maintain an effective seal against the leakage of the liquid. If it is too large, the mechanism may have its durability lowered by the chipping of the solid materials which is likely to occur easily. The effective seal width ratio rp/Di is, therefore, from 0.07/1 to 0.22/1 to ensure the restrained leakage of the liquid.

The present inventors have also tried to find a substitute for alumina ceramics as the material for a sliding member, and succeeded in finding a good material which can form an improved seal if it has an adequate surface roughness.

According to a second aspect of this invention, therefore, there is provided a mechanism comprising a stationary ring formed from baked carbon and a rotating ring formed from a sintered product of silicon nitride, the rotating ring having a surface roughness, Ra, of from 0.07 to 0.30 micron, and preferably from 0.10 to 0.20 micron. The rotating ring having a relatively high degree of surface roughness, as stated, fits the stationary ring so well that a seal of improved tightness may be maintained.

The baked carbon preferably has an apparent specific gravity not exceeding 1.66, a coefficient of thermal expansion not exceeding $2.2 \times 10^{-6}$ and a Shore D hardness of at least 100, so that the stationary ring may form a still more effective seal.

It is obvious that a still better seal can be obtained from the combination of the features according to the first and second aspects of this invention.

The sealing mechanism of this invention can be used with any of a variety of liquid pumps including a coolant pump, a water pump, an oil pump, a pump for a water-soluble lubricant and a pump for a liquid medicine.

BRIEF DESCRIPTION OF THE DRAWINGS

A preferred embodiment of the present invention will be hereinafter described, by way of example only, with reference to the accompanying drawings, in which:

FIG. 4 is another graph showing the relation as found between the ratio of the effective seal surface width of the stationary ring/its inside diameter and the amount of leakage;

FIGS. 7A, 7B and 7C are graphs showing the relations as found between the apparent specific gravity, expansion coefficient and Shore hardness, respectively, of baked carbon and the amount of leakage.

DETAILED DESCRIPTION OF THE PREFERRED EMBODIMENT

The following description is merely exemplary in nature and is in no way intended to limit the invention, or its application or uses.

Figure 1:
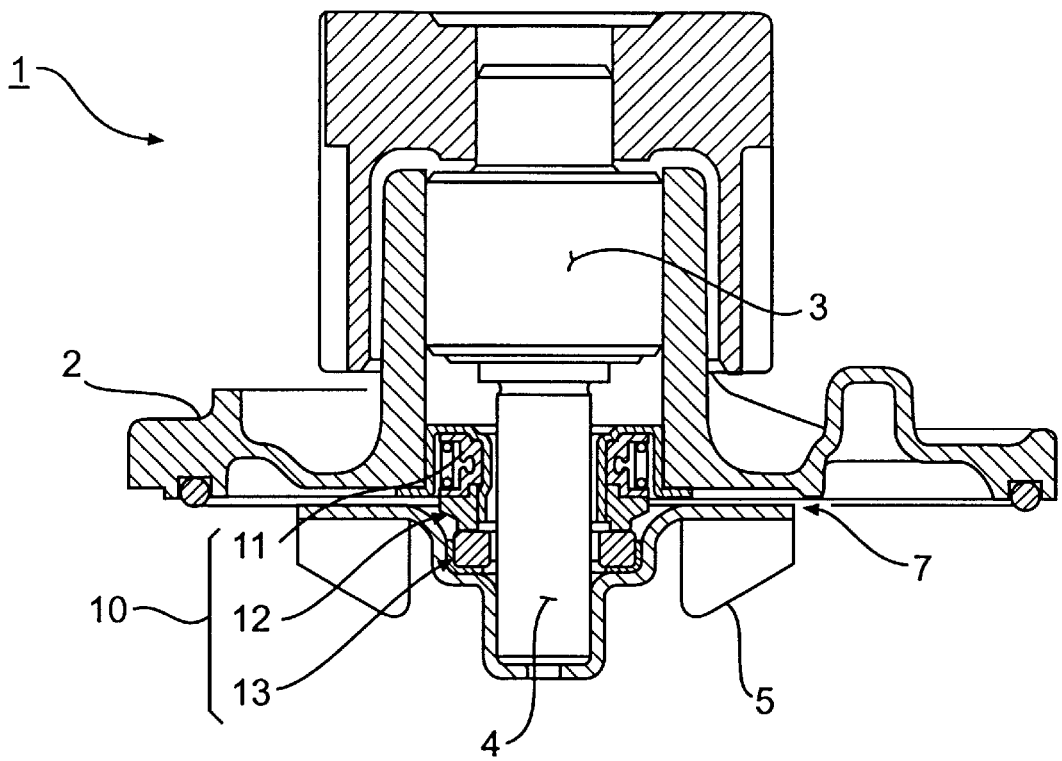
FIG. 1 is a front elevational view, partly in section, of a liquid pump provided with a sealing mechanism embodying this invention.

Referring to FIG. 1, a liquid pump 1 has a rotary shaft 4 supported in a stationary casing 2 by a bearing 3, and carrying an impeller 5 at its end. The rotary shaft 4 is rotatable by a driving force from a source of its supply not shown to rotate the impeller 5 at a high speed, so that a liquid, such as a coolant, may be drawn up from the center of rotation of the impeller 5 and discharged radially outwardly to thereby have an elevated pressure.

The casing 2 and the impeller 5 have therebetween a clearance 7 through which a part of the coolant tends to flow toward the bearing 3. A sealing mechanism 10 is, therefore, provided. The sealing mechanism 10 comprises a stationary ring 12 attached to the casing 2 with bellows 11 and a rotating ring 13 held to the impeller 5 by a retainer and contacting the stationary ring 12 to form a seal against the coolant flowing toward the rotary shaft 4.

Figure 2:
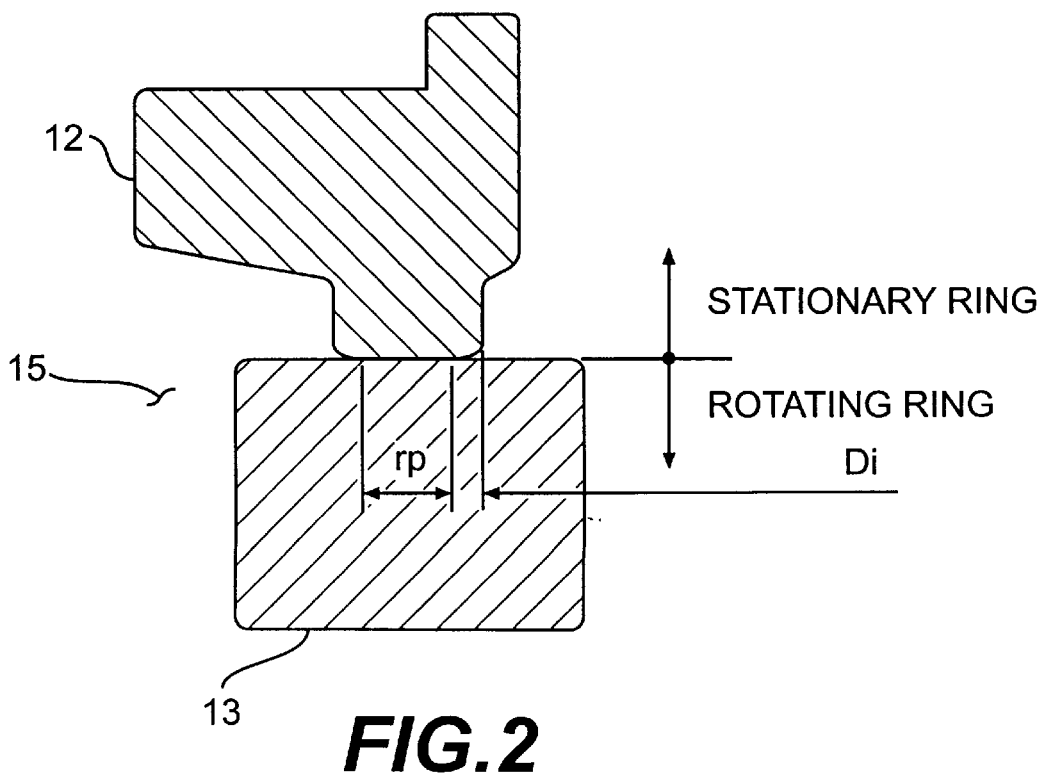
FIG. 2 is an enlarged view of a part of FIG. 1.

The stationary and rotating rings 12 and 13 contact each other to maintain a seal against the coolant 15, as shown in FIG. 2. The quality of the seal apparently depends on the shape of the sealing portion of the stationary ring 12 and the roughness of the contact surface of the rotating ring 13, which is of a harder material.

The present inventors have, therefore, conducted leakage tests, and tests for ascertaining the optimum physical properties of the stationary ring (or baked carbon), as described below, so as to ascertain the optimum shape of the sealing portion of the stationary ring and the optimum surface roughness of the rotating ring.

Figure 3:
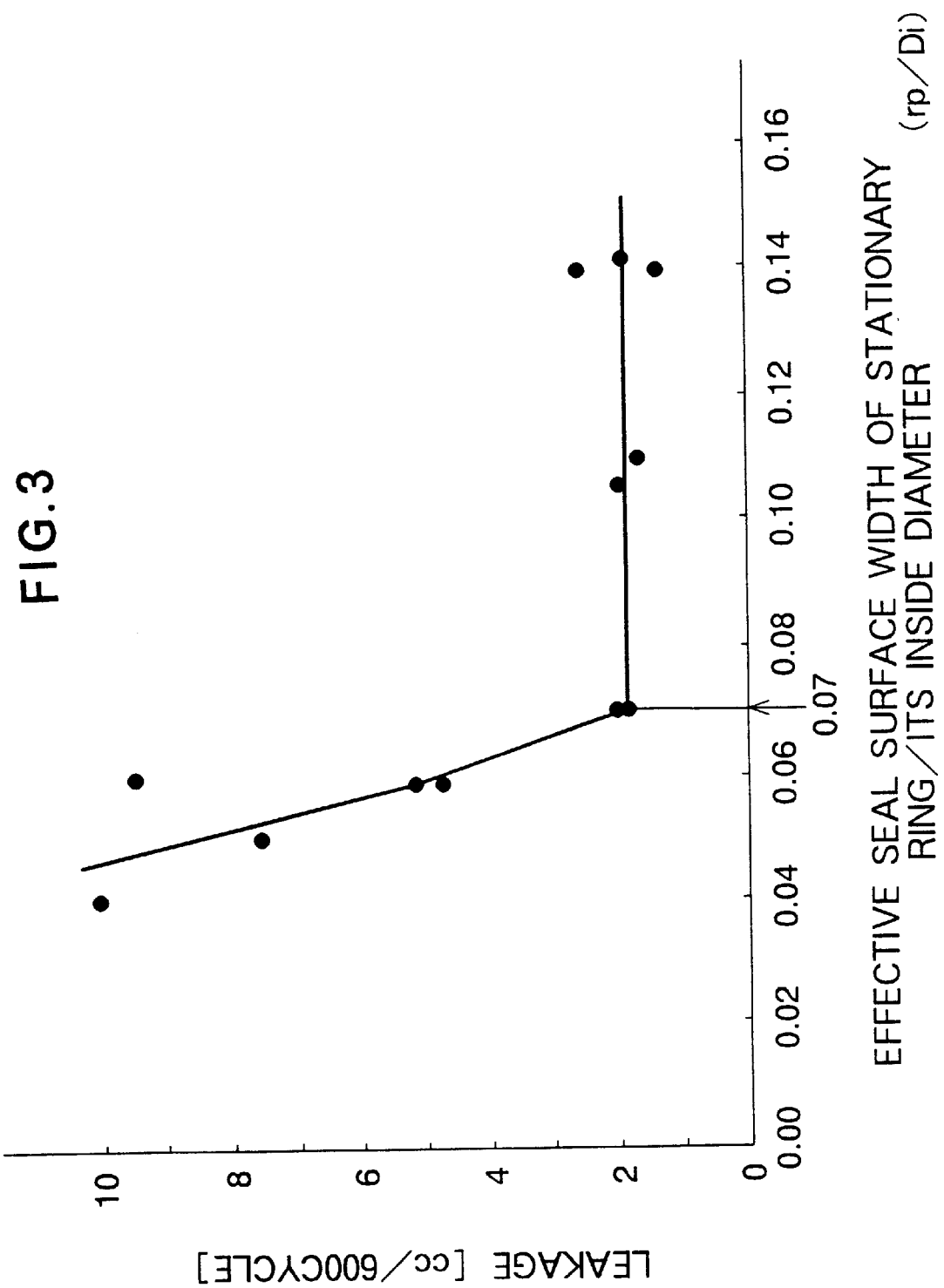
FIG. 3 is a graph showing the relation as found between the ratio of the effective seal surface width of the stationary ring/its inside diameter and the amount of leakage.

(1) Common Conditions for the Tests:
   Coolant temperature: About 120° C.
   Discharge pressure of liquid pump: About 2 kgf/cm$^2$
   Rotating speed of pump: 7,000 rpm
   Operating cycle: 20 minutes of rotation and 30 minutes out of operation
   Number of cycles tested: 600 cycles (2) Conditions for Leakage Tests on a First Combination of Rings:
   Material of rotating ring: Sintered silicon nitride ($Si_3N_4$)
   Width of rotating ring: 4.5 mm
   Material of stationary ring: Baked carbon having a Shore D hardness of 100 to 120, an apparent specific gravity of 1.56 to 1.66, an expansion coefficient of 2.2×10$^{-6}$, abending strength of 53.9 MPa and a thermoelectric conductivity of 7.4 W/mK
   Inside diameter Di (FIG. 2) of stationary ring: 17 to 20 mm
   Effective seal surface width rp (FIG. 2) of the same: 0.68 to 2.8 mm
   Contact surface pressure: About 3 kgf/cm$^2$ (3) Results of Leakage Tests on the First Combination:
The results are shown in FIG. 3. The graph shows the relation as found between the ratio of the effective seal surface width of the stationary ring/its inside diameter (rp/Di) and the amount of leakage (cc, or cm$^3$) as determined by 600 cycles of operation. The curve drawn by plotting approximately black dots representing the test results has a singular point at the rp/Di value of 0.07 and confirms that if the rp/Di value is smaller than 0.07, the effective seal surface width (rp) is too small for an effective seal.

(b 4) Conditions for Leakage Tests on a Second Combination of Rings:
   Inside diameter (Di) of stationary ring: 17 mm (fixed)
   Its effective seal surface width (rp): 0.50 to 5.0 mm
   The other conditions were as mentioned at (2) above.

(5) Results of Leakage Tests on the Second Combination:
The results are shown in FIG. 4. The graph shows the relation as found between the ratio of the effective seal surface width of the stationary ring/its inside diameter (rp/Di) and the amount of leakage (cc, or cm$^3$) as determined by 600 cycles of operation. The curve drawn by plotting approximately black dots representing the test results has two singular points at the rp/Di values of 0.07 and 0.22, respectively, and confirms that if the rp/Di value is smaller than 0.07, the effective seal surface width (rp) is too small for an effective seal, and also that if it is larger than 0.22, the width (rp) is too large.

Figure 5A:
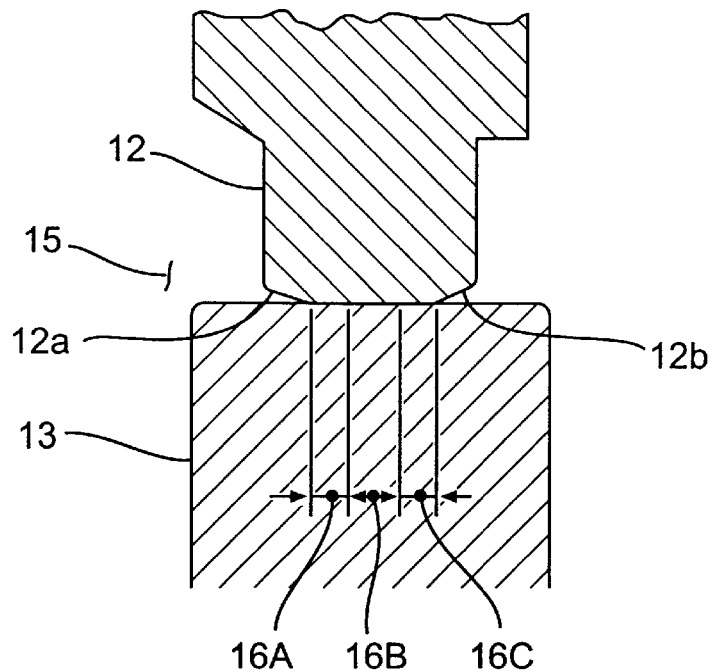
FIGS. 5A and 5B are schematic views comparing the lubrication of two different combinations of stationary and rotating rings.
Figure 5B:
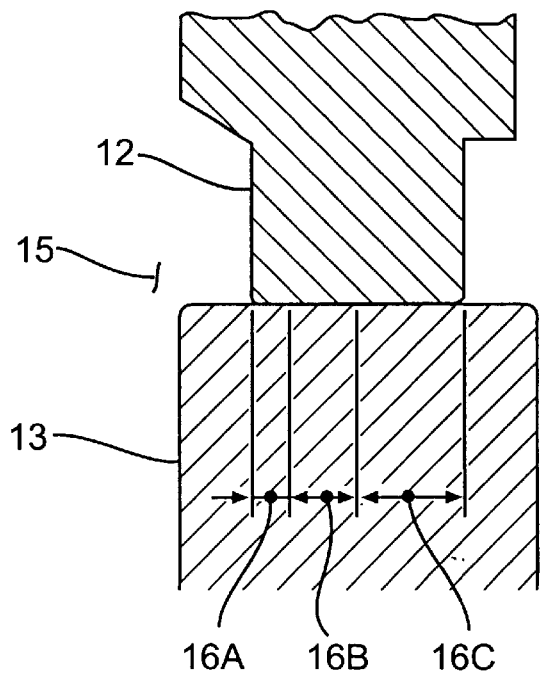

Reference is made to FIGS. 5A and 5B showing two different modes of lubrication on the stationary and rotating rings. FIG. 5A shows a stationary ring 12 having a seal surface defined between a pair of beveled surfaces 12a and 12b and contacting a rotating ring 13 to form a seal therewith against a coolant 15. The seal surface consists of a liquid lubricated area 16A lying adjacent to the coolant 15, an intermediate lubricated area 16B lying along the liquid lubricated area 16A, having a somewhat greater width and containing a compound of Si, C, O and HN, and a solid lubricated area 16C lying adjacent to the air. The seal surface is required to have a certain width, rp, as defined by the rp/Di value, since too small a width is likely to result in the failure to maintain an effective seal if foreign matter is caught between the two rings.

FIG. 5B shows a stationary ring 12 not having any beveled surface, but having a greater seal surface width than what is shown in FIG. 5A. While its seal surface likewise consists of liquid, intermediate and solid lubricated areas 16A, 16B and 16C, the liquid and intermediate lubricated areas 16A and 16B do not substantially differ in width from their counterparts in FIG. 5A, but the solid lubricated area 16C has too large a width. The stationary ring 12 as shown in FIG. 5B is, therefore, likely to have its durability lowered by the chipping of its solid material.

The results as described teach that, when a stationary ring of silicon nitride and a rotating ring of baked carbon are employed to form a seal, the stationary ring should be so sized as to have its rp/Di value fall within the range of 0.07 to 0.22.

(6) Conditions for Surface Roughness Tests:
   Material of rotating ring: Silicon nitride or alumina
   Abrasive grains used for finishing: SiC (silicon carbide), or diamond p1 Diameter of abrasive grains: 6 or 9 microns
   Finishing: Done by using fixed abrasive grains (grindstone, or lapping film), or free abrasive grains (lapping)
   Surface roughness: "Center average roughness, Ra" as defined by JIS B0601
   Leakage: Amount as determined by 600 cycles of operation These conditions and the test results as obtained are shown in Table 1.

TABLE 1

| Test | Principal material of rotating ring | Finishing Abrasive grains | Diameter of grains | Method | Surface roughness | Amount of leakage (cc/600 cycles) | Symbol |
|---|---|---|---|---|---|---|---|
| 1 | Silicon nitride ($Si_3N_4$) | SiC | 6 μm | Fixed grains | 0.2 μm | 0.5 | ○ |
| 2 | Silicon nitride ($Si_3N_4$) | SiC | 9 μm | Fixed grains | 0.2 μm | 1.0 | ○ |
| 3 | Silicon nitride ($Si_3N_4$) | Diamond | 6 μm | Fixed grains | 0.3 μm | 2.0 | △ |
| 4 | Silicon nitride ($Si_3N_4$) | SiC | 6 μm | Free grains | 0.3 μm | 2.5 | □ |
| 5 | Alumina ($Al_2O_3$) | Diamond | 6 μm | Fixed grains | 0.3 μm | 6.2 | ▲ |
| 6 | Alumina | SiC | 6 μm | Fixed | 0.2 μm | 8.1 | ● |

TABLE 1-continued

| Test | Principal material of rotating ring | Finishing | | | | Amount of leakage (cc/600 cycles) | Symbol |
|---|---|---|---|---|---|---|---|
| | | Abrasive grains | Diameter of grains | Method | Surface roughness | | |
| | ($Al_2O_3$) | | | grains | | | |
| 7 | Silicon nitride ($Si_3N_4$) | SiC | 6 μm | Fixed grains | 0.1 μm | 0.8 | ○ |
| 8 | Silicon nitride ($Si_3N_4$) | SiC | 6 μm | Fixed grains | 0.03 μm | 4.0 | ○ |
| 9 | Silicon nitride ($Si_3N_4$) | SiC | 6 μm | Fixed grains | 0.01 μm | 6.0 | ○ |
| 10 | Silicon nitride ($Si_3N_4$) | SiC | 6 μm | Fixed grains | 0.35 μm | 4.0 | ○ |

Figure 6:
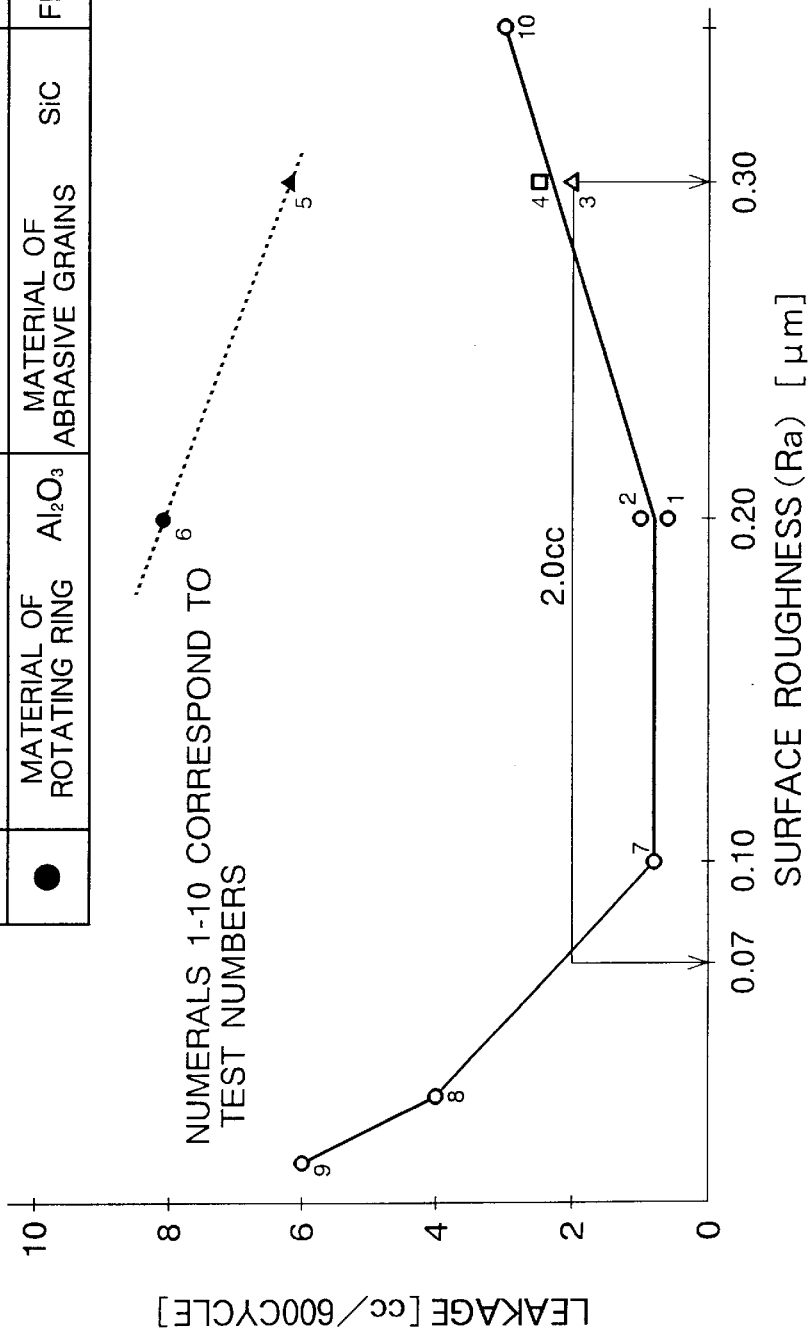
FIG. 6 is a graph showing the relation as found between the surface roughness of the rotating ring and the amount of leakage.

Tests Nos. 1 to 10 were conducted, and resulted in a leakage 9 of 0.5 to 8.1 cc. The results are also shown in FIG. 6. The graph shows the relation as found between the surface roughness (Ra) of the rotating ring and the amount of leakage (cc) as determined by 600 cycles of operation. For further information on the symbols used in FIG. 6, such as circles and triangles, reference is made to Table 1. The numerals attached to the symbols correspond to Test Numbers appearing in Table 1.

Test Nos. 5 (black triangle) and 6 (black circle) showed a very large amount of leakage, since the rotating rings were of alumina. All of the other tests showed a relatively small amount of leakage, since the rotating rings were of silicon nitride ($Si_3N_4$), and the rotating rings having a surface roughness (Ra) of 0.1 or 0.2 micron were found to form a particularly good seal with a leakage of 1.0 cc or less.

FIG. 3, however, shows 2.0 cc as the minimum amount of leakage resulting from 600 cycles of operation. If the value of 2.0 cc is accepted as a practically feasible minimum amount of leakage, therefore, it is obvious from FIG. 6 that the rotating ring is allowed to have a surface roughness (Ra) of 0.07 to 0.30 micron.

Thus, when the stationary ring is formed from baked carbon, while the rotating ring is formed from a sintered product of silicon nitride, the rotating ring preferably has a surface roughness (Ra) of 0.07 to 0.30 micron if the stationary ring is of baked carbon. Most preferably, the surface roughness (Ra) may be in the range of 0.10 μm–0.30 μm so that leakage can be reduced to about a half amount.

(7) Optimum Physical Properties of Baked Carbon:

Tests were conducted by preparing stationary rings from three different kinds of baked carbon having different physical properties according to an Example of this invention and Comparative Examples 1 and 2, as shown below.

Example: Baked carbon having an apparent specific gravity of 1.60, an expansion coefficient of $2.2 \times 10^{-6}$ and a Shore D hardness of 110;

Comparative Example 1: A product of Nippon Carbon Co., EG-5E3, having an apparent specific gravity of 1.85, an expansion coefficient of $4.0 \times 10^{-6}$ and a Shore D hardness of 65; and Comparative Example 2: A product of Nippon Carbon Co., HC-5E3, having an apparent specific gravity of 1.78, an expansion coefficient of $4.0 \times 10^{-6}$ and a Shore D hardness of 95.

The tests were otherwise conducted by repeating the conditions as stated at (2) before. The results are shown in FIGS. 7A, 7B and 7C.

FIG. 7A shows the amount of leakage in relation to the apparent specific gravity of baked carbon. Larger amounts of leakage were found from Comparative Examples 1 and 2 employing baked carbon having a higher apparent specific gravity than the value of 1.60 of the baked carbon according to Example of this invention. These results teach it is preferable to use baked carbon having as low an apparent specific gravity as possible, and at most a value not exceeding 1.66 as stated at (2) before.

FIG. 7B shows the amount of leakage in relation to the expansion coefficient of baked carbon. Example of this invention employing baked carbon having the lowest expansion coefficient showed the smallest amount of leakage. It is apparent that a stationary ring having a high expansion coefficient may undergo a high degree of thermal deformation, and that the stationary and rotating rings may form an irregular clearance therebetween resulting in a less effective seal. Therefore, it is preferable to use baked carbon having as low an expansion coefficient as possible, at most not exceeding $2.2 \times 10^{-6}$ as in the case of baked carbon according to Example of this invention.

FIG. 7C shows the amount of leakage in relation to the Shore hardness of baked carbon. Example of this invention employing baked carbon having the highest hardness showed the smallest amount of leakage, apparently because the two rings were less likely to have an increased width in their clearance. Thus, the stationary ring preferably has a Shore D hardness of at least 100.

Thus, it is preferable to use for the stationary ring baked carbon having an apparent specific gravity not exceeding 1.66, a thermal expansion coefficient not exceeding $2.2 \times 10^{-6}$ and a Shore D hardness of at least 100 in order to ensure the formation of an effective seal.

Obviously, various minor changes and modifications of the present invention are possible in the light of the above teaching. It is therefore to be understood that within the scope of the appended claims the present invention may be practiced otherwise than as specifically described.

What is claimed is:

1. A mechanism comprising a stationary ring attached to a casing of a liquid pump and a rotating ring attached to a rotary shaft of the liquid pump and contacting the stationary ring to form a liquid-tight seal around the rotary shaft extending through the casing, wherein said stationary ring is formed from baked carbon, while said rotating ring is formed from a sintered product of silicon nitride, and said stationary ring has an effective seal width ratio, rp/Di, of 0.07/1 to 0.22/1, where rp is the width of the effective seal surface of said stationary ring and Di is its inside diameter.

2. A mechanism as set forth in claim 1, wherein said carbon has an apparent specific gravity not exceeding 1.66, a thermal expansion coefficient not exceeding $2.2 \times 10{-6}$ and a Shore D hardness of at least 100.

3. A mechanism comprising a stationary ring attached to a casing of a liquid pump and a rotating ring attached to a rotary shaft of the liquid pump and contacting the stationary ring to form a liquid-tight seal around the rotary shaft extending through the casing, wherein said stationary ring is formed from baked carbon, while said rotating ring is formed from a sintered product of silicon nitride, and said rotating ring has a surface roughness, Ra, of 0.07 to 0.30 micron.

4. A mechanism as set forth in claim 3, wherein said rotating ring has a surface roughness, Ra, of 0.10 to 0.20 micron.

5. A mechanism as set forth in claim 3, wherein said carbon has an apparent specific gravity not exceeding 1.66, a thermal expansion coefficient not exceeding $2.2 \times 10^{-6}$ and a Shore D hardness of at least 100.

* * * * *